United States Patent
Jackson et al.

(10) Patent No.: US 8,365,189 B2
(45) Date of Patent: Jan. 29, 2013

(54) METHOD AND APPARATUS FOR A SERVICE CONTROL LAYER

(75) Inventors: Callum Peter Jackson, Fareham (GB); Lee Keith Longmore, London (GB); Sandip Shah, Hove (GB); Yuk-Lun Wong, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/039,100

(22) Filed: Feb. 28, 2008

(65) Prior Publication Data
US 2008/0209438 A1     Aug. 28, 2008

(30) Foreign Application Priority Data
Feb. 28, 2007 (EP) .................................. 07103207

(51) Int. Cl.
*G06F 3/00* (2006.01)
(52) U.S. Cl. ........................................................ 719/313
(58) Field of Classification Search .................. None
See application file for complete search history.

(56) References Cited

U.S. PATENT DOCUMENTS

| 7,046,680 | B1 * | 5/2006 | McDysan et al. | 370/396 |
|---|---|---|---|---|
| 2002/0052966 | A1 * | 5/2002 | Isomura et al. | 709/230 |
| 2002/0196741 | A1 * | 12/2002 | Jaramillo et al. | 370/252 |
| 2003/0187992 | A1 * | 10/2003 | Steenfeldt et al. | 709/227 |
| 2004/0153547 | A1 * | 8/2004 | Trossen | 709/228 |
| 2006/0075125 | A1 * | 4/2006 | Burckart et al. | 709/229 |

FOREIGN PATENT DOCUMENTS
WO    2004/057837 A1    7/2004

\* cited by examiner

*Primary Examiner* — S. Sough
*Assistant Examiner* — Carina Yun
(74) *Attorney, Agent, or Firm* — Patents on Demand P.A.; Brian K. Buchheit; Scott M. Garrett (57) ABSTRACT

This invention relates to a method, system and computer program product for managing a service message in a service oriented architecture system including a service provider, a service consumer and a set of control services, the method, system and computer program product comprising the following steps: receiving a service message; selecting a group of rules from a set of rule groups depending on the type of service message; selecting a control service from a set of control services and instructing the selected control service according to one or more of the rules from the selected rules group applied to the service message.

16 Claims, 4 Drawing Sheets

METHOD AND APPARATUS FOR A SERVICE CONTROL LAYER

CROSS-REFERENCE TO RELATED APPLICATIONS

This application claims the benefit of European Patent Application No. 07103207.2 filed 28 Feb. 2007, which is hereby incorporated by reference.

BACKGROUND OF THE INVENTION

This invention relates to a method and apparatus for a service control layer that intercepts service messaging and applies control logic for a range of business control functions.

A service provider is an entity offering multimedia services typically applies provider specific service control logic for control services, such as charging services, authorization services, authentication services, etc., to the multimedia service implementation. That is, the control logic includes a set of one or more control services distinguishable from the core programmatic logic of the multimedia service being provided. The service provider is typically required to implement the control services itself and this incurs additional costs and delay in creating, testing, maintaining, and providing code of the multimedia service. These control services are generally coupled directly with the code with implements the core programmatic logic in an inseparable fashion. In addition, it means that the service provider is unable to license the unmodified service implementation to other service providers (e.g., telecommunications providers), who would usually require an enablement of different control services specific to each of the different service providers. For example, different service providers can include service provider specific authentication logic, provider specific charging logic, provider specific service monitoring and tracking logic, and the like.

Figure 1A:
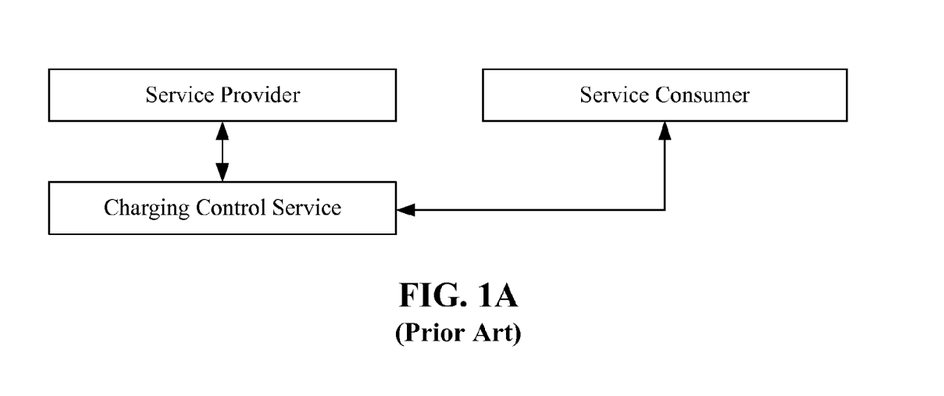
FIG. 1A (Prior Art) is a schematic of a known service configuration comprising: a Service Provider; a Service Consumer and a Charging Control Service.

A known Charging Control Service is shown in FIG. 1A (Prior Art). A Service implemented by a Service Provider sends a service request to a Charging Control Service to charge a Service Consumer for the Service. The Charging Control Service applies charging control logic specifying a manner in which the Consumer is billed for the Service.

Figure 2:
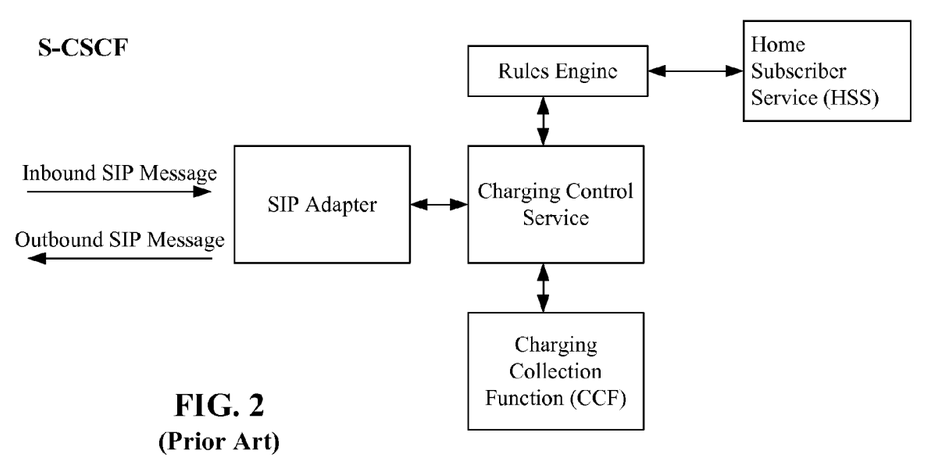
FIG. 2 (Prior Art) shows in more detail a prior art Charging Control Service.

The Charging Control Service is shown in more detail in FIG. 2 (Prior Art). Inbound Session Initiation Protocol (SIP) messages are received by a Serving Call Session Control Function (S-CSCF) SIP adapter and forwarded to an S-CSCF Controller. The Controller applies rules from a Rules Engine and account data from a Home Subscriber Service (HSS) to the SIP Message before interacting with a Charge Collection Function (CCF). The S-CSCF creates charging records based on the outcome of the SIP session and submits the records to the Charging Collection Function (CCF).

BRIEF SUMMARY OF THE INVENTION

According to a first aspect of the present invention there is provided a method for managing a service message in a service system including a service provider, a service consumer, and a set of control services. The method executes in context of a service control layer, which "taps" into sessions between parties in which services provided by service providers execute. The service control layer is able to implement a stateful and rules driven mechanism, referred to as a state machine mechanism, for controlling and enriching a delivery of the services. These rules are configurable and can cause programmatic actions to occur, which can enhance a base service, charge for a base service, monitor aspects of the base service, authorize one or more users to utilize the base service, and the like. In one embodiment, each user service session can be associated with a session specific state machine instance. This session specific state machine instance can be used to selectively trigger an execution of control services in accordance with configurable rules at different points in a lifecycle of the user service session. Moreover, the service control layer may take control of a session during processing of an initial or subsequent service message following rules evaluation of service messages and/or responses from calls to control services.

The method can include receiving or intercepting one or more service message. Based upon this service message, the state machine mechanism of the service control layer can discern a state or set of previously defined conditions applicable given the service message. A group of one or more rules associated with the discerned state and/or conditions can be selected from a set of rule groups. That is, the rules selected can depend on the type of service message and content contained therein. These rules can trigger an execution of one or more control services from a set of previously defined control services that are situationally applicable to services of one or more service providers. The rules can also determine parameters applicable to the execution of the selected control services. When no rules apply to a given service message, the message can be conveyed as if no interception occurred. During any given user service session, multiple service messages can be intercepted that each cause one or more control services to execute in accordance with the rules established by the state machine mechanism.

In one embodiment, the method is embodied in a rule driven engine contained in the service control layer. The rules can be defined in high level business type syntax. For example, "at the start of the service log and charge 10p" and "at the end of the service charge 5p for each minute the service was active". A business analyst writing the rules does not need to be exposed to the underlining protocol because it is in a neutral format. The rules can be applied to any message (e.g., a SIP Initial Request, Response, Subsequent Request) and generate one or more application program interface (API) calls to control services based on the evaluation of these rules. Groups of rules may be defined for each type of message. The embodiment can interface into any backend system utilizing a Control Enabling Proxy interface and can communicate with a wide array of backend control services providing charging; provisioning; logging; and other control services.

In one embodiment, the method includes converting the service message into a common format so that the service message data is common for all types of service messages. The embodiment supports inbound messages submitted via either Session Initiation Protocol (SIP) or Web Service invocations. The invention manages to handle both protocols via the Web Service Translator and SIP Translator (shown in FIG. 2). These components convert the inbound protocol specific message into a protocol neutral format.

In another embodiment, the method can forward the message to the destination or retaining the message for processing depending on if the message is listed on an optimization list. The messages on the optimization list depend on the state of the state machine. The messages on the optimization list are updated after each message is processed, which means these messages are updated for each change of state of the state machine. The embodiment includes a Web Service/SIP optimizer. This is used to process the inbound protocol message at the earliest opportunity to determine if the system requires processing of the message. If the message does not require any further processing then no additional time or system resources are utilized and the message is released.

The control service can be selected from the set of control services based on information in the service message. That is, a state machine can trigger a call to appropriate business rules, upon a receipt of a service message of interest. Through the processing of these business rules, which may or may not use information in the service message, one or more control services (e.g., Reserve Charge) with parameters (when necessary) can be added to an execution sequence list. It can be a function of a Control Sequence Processor to map each of these control services to a corresponding Control Enabling Proxy, which in turn maps the services to appropriate operations (and parameters) of a Control Provider API.

Zero or more control services can be triggered for each received service message in accordance with the rules established for the state machine. Further, one or more of the control services can be selected based at least in part upon a consumer preference referenced by consumer information in the service message or in external profile databases accessible to the rules engine. Service session specific state machine instances can execute in a service control layer (SCL), one for each service session. The SCL provides the ability to customize what messages of interest would be processed via the service specific state machines. These service specific state machines allow the user to define new points within the SIP or Web Service dialogue so that a business analyst can define the control services required for the system.

Suitably, the method further includes building a control instruction according to the one or more rules from the selected rules group applied to the service message. More suitably, the method further includes adding one or more control instructions to a control sequence list associated with one or more control services.

According to a second aspect of the present invention, there is provided a service control layer for managing a message in a service oriented architecture system including a service provider providing a service, a service consumer and a set of control services. The service control layer includes an interface for intercepting service messages, a service selector for selecting a group of rules from a set of rule groups depending on the type of service message, and a controller for selecting a control service from a set of control services and instructing the selected control service according to one or more of the rules from the selected rules group applied to the service message. In one implementation, a stateful machine mechanism in accordance with configurable rules can be used to determine which control services (if any) are to be executed responsive to a received message. A distinct state machine instance can exist for each service session, which is used to handle control services for that session.

According to a further aspect of the invention, there is provided a computer program product including computer readable recording medium having computer readable code stored thereon for managing a service message in a service oriented architecture system including a service provider providing a service, a service consumer and a set of control services. The computer readable code which, when loaded onto a computer system and executed, can perform the following steps: receiving a service message selecting a group of rules from a set of rule groups depending on the type of service message; selecting a control service from set of control services and instructing the selected control service according to one or more of the rules from the selected rules group applied to the service message.

BRIEF DESCRIPTION OF THE SEVERAL VIEWS OF THE DRAWINGS

Embodiments of the invention will now be described, by means of example only, with reference to the accompanying drawings in which.

DETAILED DESCRIPTION OF THE INVENTION

Figure 1B:
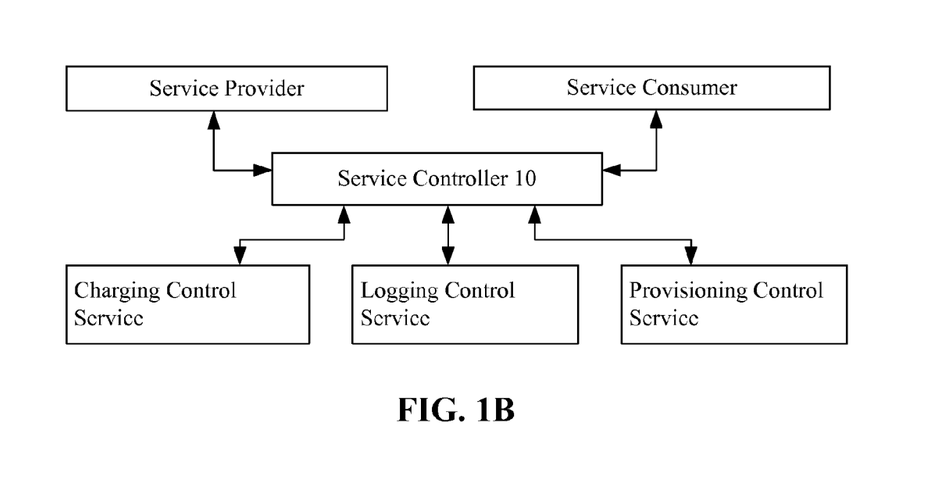
FIG. 1B is a schematic of the service configuration of the present embodiment comprising a Service Provider; a Service Consumer; Control Services and a Service Controller according to the preferred embodiment of the invention.

Referring to FIG. 1B there is shown a schematic of the service configuration of the present embodiment including a Service Provider providing at least one service, a Service Consumer, Control Services and a Service Controller 10 according to an embodiment of the invention. Examples of control service interfaced by the Service Controller 10 include: a logging control service to log specific interacts of a Consumer, a charging control service that charges a Consumer for a Service, and a provisioning control service that sets up another control service for use by the Consumer. In one embodiment, the Service Controller 10 can include a state machine mechanism, which causes control services to be executed in accordance with configurable rules driven by state data of an associated service of the Service Provider. Further in one configuration, each service session can be associated with a unique state machine instance, which controls a manner in which the control services execute for that service session.

Figure 3:
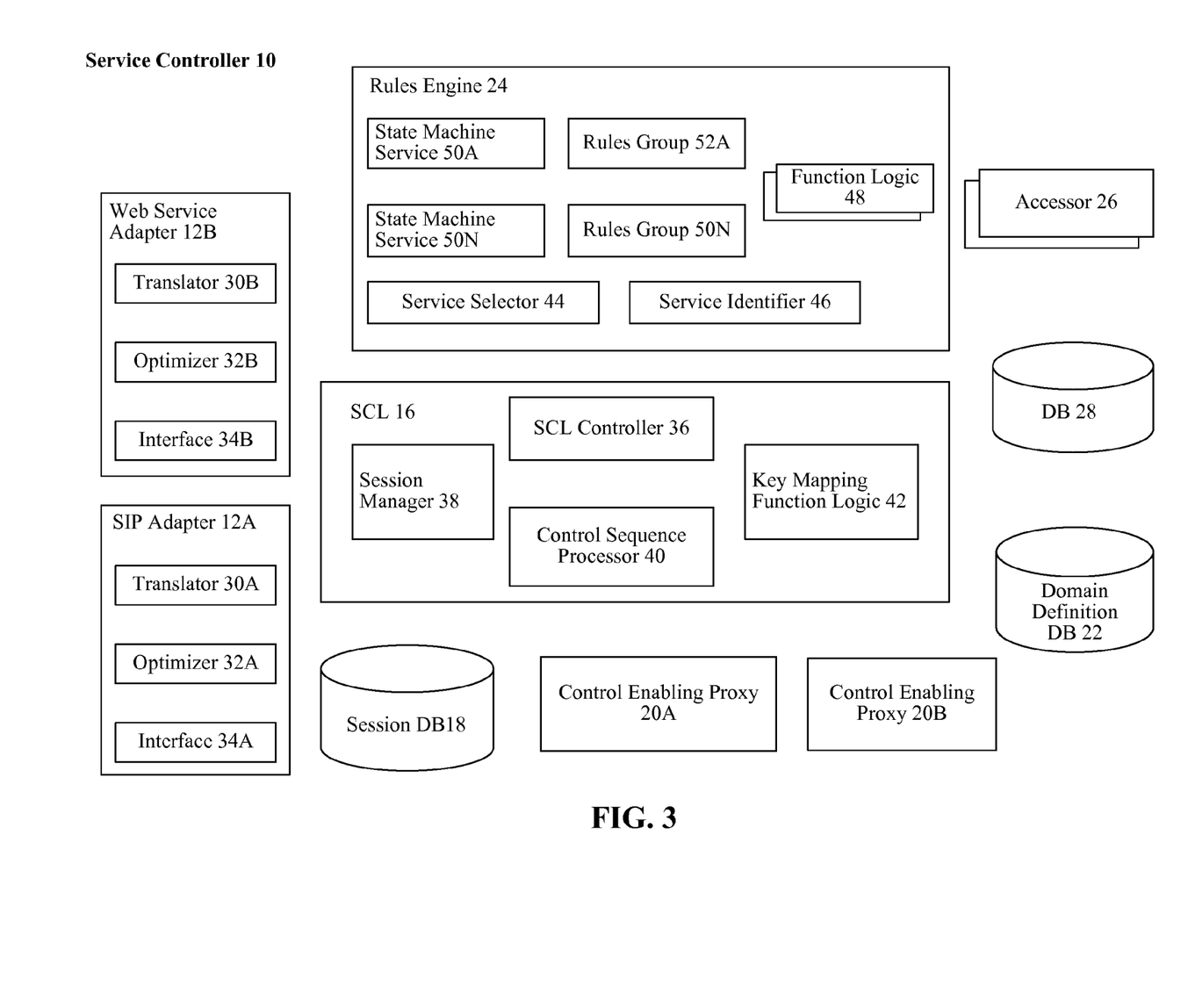
FIG. 3 shows in more detail the Service Controller of the an embodiment of the disclosed invention.

Referring to FIG. 3, Service Controller 10 includes: SIP Adapter 12A, Web Service Adapter 12B, Service Control Layer (SCL) 16, Session Database (DB) 18, Control Enabling Proxies (CEP) 20A, 20B, Domain Definition Database (DB) 22, Rules Engine 24, Accessor 26 and Accessor Database (DB) 28. SIP Adapter 12A and the Web Service Adapter 12B respectively include: Translators 30A and 30B, Optimizers 32A and 32B, and Interfaces 34A and 34B. SCL 16 includes: SCL Controller 36, Session Manager 38, Control Sequence Processor 40, and Key Mapping Function Logic 42. Rules Engine 24 includes: Service Selector 44, Service Identifier 46, Function Logic 48, State Machine Services (50A to 50N), and Business Control Rule Groups (52A to 52N).

In one embodiment, the interface 34A, the service selector 44, and the controller of the service controller 10 can function as a session bridging point between a service consumer utilizing a service and a service provider of the service. Additionally, in one embodiment, the service control layer can permit control services to be injected into an unmodified version of the service in accordance with the rule groups 50N and 52A.

Interfaces 34A and 34B allow the consumption and generation of service messages. Optimizers 32A and 32B provide the ability to optimize follow-on message processing by filtering messages before they are passed to other components of SCL 16. The Interfaces pass inbound service messages to the respective Optimizers. A response service message is returned to the respective Interfaces after processing. Translators 30A and 30B convert between the raw service messages and the SCL internal format. The input will be the original service message and a corresponding session context object, and a response service message returned after processing.

SCL 16 is primarily focused around enabling controls to be applied to multimedia sessions at runtime without impact on the service itself. Controls may be applied at any point in the interaction of a session based on business rules defined by business analysts. This is achieved by modeling the "conversation" of a service in such a way that the SCL can intercept the messages of interest (SIP or Web Service) and determine which controls to apply based on the business rules specified. Example services include the session messages exchanged between individuals (such as peer-to-peer IP telephony) or between a service application and a service user(s). If SCL 16 senses an error condition during a session, it can automatically call a customer care sub-system in real-time, passing details of the service and the subscriber affected such that proactive customer care can take place.

SCL Controller 36 is the orchestration point for routing messages between Rules Engine 24, Control Sequence Processor 40 and Adaptors 12A and 12B.

Session Manager 38 manages each service session and stores data in Session Database 18. Session Manager 38 acts as the sole access point to Session Database 18. Session Manager 38 provides for the creation, retrieval, modification and deletion of session context objects in the database. Session context information is stored to allow SCL 16 to maintain session-wide information; its principal function is to optimize SCL 16's performance by recording which subsequent messages should be processed and by ensuring that service identification rules are only executed once.

Control Sequence Processor 40 executes a Control Execution Sequence generated by Rules Engine 24 for each service message of interest. When multiple control services are to execute responsive to a single service message, the Control Sequence Processor 40 can determine an execution order (if any) of the control services. Control Enabling Proxy 20A (or CEP 20B) is instructed to call one or more Control Services (e.g., the Charging Control Service, the Logging Control Service, or the Provisioning Control Service, etc.). Control Sequence Processor 40, based on directives in the Control Execution Sequence and responses received from CEPs 20A and 20B, determines whether or not SCL 16 needs to take control of a user service. If SCL 16 does take control, it uses user-defined mapping to generate an appropriate response, such as SIP 2xx, 4xx, WS-FAULT, and the like.

CEP 20A or CEP 20B is used to directly interface the application layer of a specific Control Service and expose its operations. CEP 20A or 20B will utilize predefined mapping information at runtime to map the fields and user-defined properties associated with a received user service message to the operations/arguments of a Control Service. This includes mapping of responses and also look-up of key value pairs (e.g., SIP URI to billing account number).

Key Mapping Function Logic 42 interfaces between the Rules Engine and CEPs during the Control interaction so that the Control is controlled by the Rules Engine 24. Key Mapping Function 42 is responsible for converting input data in the internal SCL format into the input parameters required by the control service. For most data, the conversion involves extracting the relevant information and passing it into the enabler. Perhaps the format of the data needs to be changed (e.g., from a string into an integer) but data stays essentially the same. For some data, however, this simple form of mapping is insufficient. For example, the user of a mobile service is typically identified by the handset from which the call originates. This could be the phone number of the caller. This user may need to authenticate with a third party authentication service (the control enabler) in order to access additional service. The authentication service may require a customer ID that the caller has registered with the third party service provider, not their phone number. The purpose of the key mapping function is to provide the database lookup to ensure that the correct information is presented to the enabler.

Domain Definition Database 22 contains data describing which user services are supported.

Rules Engine 24 receives all service messages and passes them to Service Selector 44. Service Selector 44 identifies a new service message for a new service session and forwards it to Service Identifier 46; all other messages with identified service sessions are passed to a specific State Machine Service that has been identified with the service session.

Service Identifier 46 identifies the service required on receipt of an initial service message, associates the identified service with a new service session and applies the relevant control enabling proxy. In addition, the state machine defines the Future Processing Directives; for example, which service messages are to be passed to the Rules Engine for this instance of the service, for this user. These Directives allow Optimizers 32A and 32B to filter unwanted messages at the adapter level, reducing latency and the processing requirement of the SCL. Different Future Processing Directives can be specified each time a message is routed to the state machine, providing the ability to dynamically adapt to different future service messages. For each message of interest, user-defined business rules are applied to determine what controls should be triggered. These are expressed in the form of a Control Execution Sequence for interpretation by Control Sequence Processor 40.

Function Logic 48 provides a business level API that can be utilized by a Business Analyst that ultimately retrieves data from one or many data sources via the appropriate Accessor. An example of an exposed function would be Boolean isUserPayAsYouGo(String userID).

Accessor 26 acts as a layer of abstraction to one or more data sources. It provides a finer grained API to that of Function Logic 48; however, the returned data will be data source independent. An example of a function an accessor might expose to a function logic is: UserProfile getUserProfile (String userID).

Figure 4:
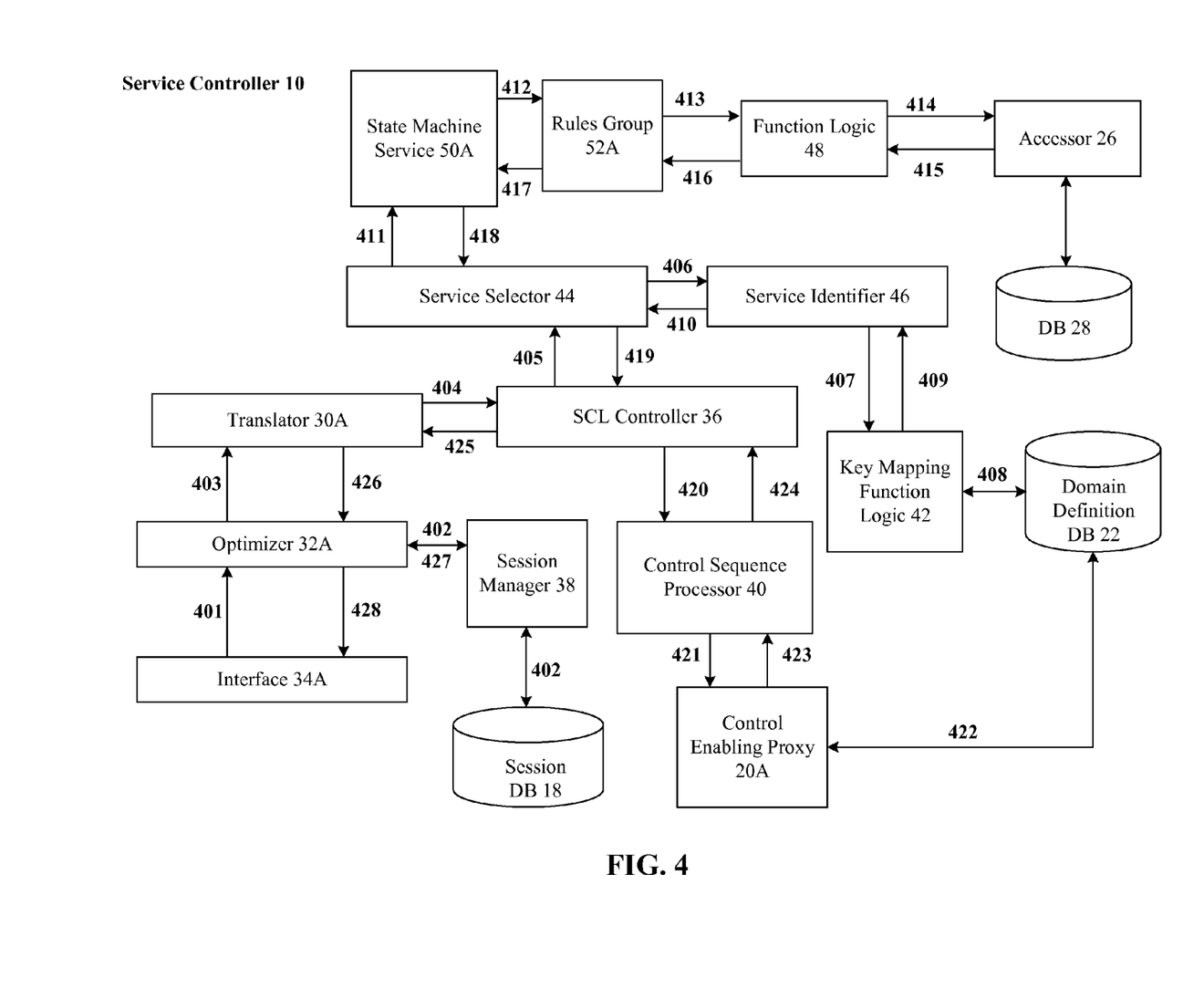
FIG. 4 shows a flow of messages between components in the Service Controller of an embodiment of the disclosed invention.

FIG. 4 and accompanying description illustrate the principal data flows for the SCL for a SIP message from SIP Adapter 12A. However, the service message could be a generic Web Service message from Web Service Adapter 12B. Only one Control Enabling Proxy 20A, and one Function Logic 48 and Accessor 26 pair is described for the sake of clarity. More complex service messages using multiple Control Enabling Proxies and multiple Function Logic and Accessor pairs operate in the same way.

In step 401, the service message is received into the SCL 16, without any translation or enrichment via Interface 34A and passed on to Optimizer 32A.

In step 402, Optimizer 32A attempts to retrieve a Session Context from Session DB 18 via Session Manager 38. If no such Session Context exists then Optimizer 32A will create a Session Context. If the Session Context does exist and the SCL does not need to process the message (based on a Future Processing Directive stored in the Session Context) then the SCL updates the message history, writes the revised Session Context to the Session Database 18, and passes the service message back to the Interface for onward forwarding to its destination.

In step 403, Optimizer 32A passes on the original service message and the Session Context to Translator 30A.

In step 404, Translator 30A converts the service message into the Common Format and sends it, together with the Session Context to SCL Controller 36.

In step 405, SCL Controller 36 passes the Session Context and the Common Format directly to Service Selector 44.

In step 406, the Service Identifier 46 receives the Session Context and Common Format service message where this is an initial service message.

In step 407, Service Identifier 46 calls Key Mapping Function Logic 42 to facilitate determination of the service. The format of the data passed is custom to the Key Mapping Function Logic component including key fields from the Common Format.

In step 408, Key Mapping Function Logic 42 retrieves custom data from Domain Definition Database 22. The custom format of this data is dependent on the data model of Domain Definition Database 22.

In step 409, Key Mapping Function Logic 42 returns relevant domain data and enable Service Identifier 46 to determine the service In step 410, Service Identifier 46 returns the Session Context. This will have been modified to include the service name.

In step 411, Service Selector 44 passes the Session Context and Common Format to a service-specific State Machine 50A. Step 411 will, in the case of an initial request message, cause a unique (and appropriate) state machine instance to be created for the user service session.

In step 412, State Machine 50A determines the state of the service, and updates the Common Format with the abstract message name and Future Processing Directives. It passes the Session Context and Common Format to the determined service specific Rule Group 52A.

In step 413, Rule Group 52A calls Function Logic 48 to facilitate determination of the execution sequence. The format of the data passed will be custom to Function Logic 48 but includes key fields from the Session Context and Common Format.

In step 414, Function Logic 48 needs to pass key information from the Custom Data to Accessor 26 to allow it to bring back the necessary external data.

In step 415, the Accessor returns data that represents an abstracted, source-neutral, business entity (e.g., a User Profile). The format will be custom, and will vary by business entity.

In step 416, Function Logic 48 returns the outcome of its functional processing. While this is custom data, it is expected that many functions will return a similarly-typed object. For example, many functions may return a Boolean value.

In step 417, Rule Group 52A returns an Execution Sequence.

In step 418, State Machine 50A returns the Session Context, which it may have modified with Future Processing Directive, and the Common Format, which it may have modified with the abstract message name, along with the Execution Sequence.

In step 419, Service Selector 44 sends the Execution Sequence to SCL Controller 36. The Session Context and Common Format is also returned, as they may have been modified by the Rules Group 52A.

In step 420, SCL Controller 36 passes on to the Control Sequence Processor 40 all the necessary data it needs for processing and for sending on to the Control Enabling Proxy (CEP) 20A.

In step 421, Control Sequence Processor 40 invokes a CEP 20A and pass over the Session Context, Common Format and a specific operation name as a string.

In step 422, CEP 20A determines what specific mappings are required when sending data to a specific Control Enabler. CEP 20A retrieves this mapping data from the Domain Definition Database 22.

In step 423, CEP 20A returns the Session Context and Response. CEP 20A modifies the Session Context with additional user-defined fields and returns the Response that contains information as to the success of the invocation.

In step 424, Control Sequence Processor 40 passes back to SCL Controller 36 the Common Format and the Session Context. The Common Format may have been modified to include an error response. It is also possible that the Session Context may have been augmented with additional data by the Control Sequence Processor. This additional data may have come from the Control Enabler, via the CEP.

In step 425, SCL Controller 36 passes back to Translator 30A the Session Context and Common Format that it has received from Control Sequence Processor 40. Neither of these items will have been modified by SCL Controller 36.

In step 426, Translator 30A converts the Common Format into the service message for sending onwards. It will also pass on the Session Context.

In step 427, Optimizer 32A updates Session Database 18, via Session Manager 38 with the Session Context.

In step 428, Optimizer 32A passes on the service message that it has received from Translator 30A to Interface 34A for onward forwarding to its destination One example application of the service controller 10 is real-time triggering of proactive customer care on detection of error in service "conversation". An end user may invoke a service and experience technical difficulties, due to a problem with the availability of the service or user error. The SCL could detect these failures and interface with the customer care system to notify the appropriate resource of the issue. This could either result in a technician been dispatched to repair the service or a customer adviser contacting the user to provide assistance.

Another example of the use of the service controller 10 is just-in-time provisioning/configuration of service capabilities. A user may request to establish a service between themselves and a remote party. The defined service may require certain configuration or provisioning to occur either by the service, or on the device currently being used by the remote party. The SCL could dynamically interact with the configuration of the service or provisioning system to ensure that the service will succeed.

A further example of the use of the service controller 10 is to blend event-based or session based online charging into a peer-to-peer service. Current interfaces into online charging systems can be rigid and not provide the flexibility desired. The SCL can either charge based on defined events that occur, or based on the session. The administrator of the system is fully within control of the charging methodology used.

It will be clear to one skilled in the art that the method of the present invention may suitably be embodied in a logic apparatus including logic means to perform the steps of the method, and that such logic means may include hardware components or firmware components. For instance, FIG. 3 shows a logic embodiment.

It will be equally clear to one skilled in the art that the logic arrangement of the present invention may suitably be embodied in a logic apparatus including logic means to perform the steps of the method, and that such logic means may include components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

The present invention may suitably be embodied as a computer program product for use with a computer system. Such an implementation may include a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems.

Further, such instructions may be stored using any memory technology, present or future, including but not limited to, semiconductor, magnetic, or optical, or transmitted using any communications technology, present or future, including but not limited to optical, infrared, or microwave.

While it is understood that the process software may be deployed by manually loading directly in the client, server and proxy computers via loading a storage medium such as a CD, DVD, and the like, the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The process software is integrated into a client, server and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

The invention claimed is:

1. A method for managing a service message in a service system, said method comprising:
receiving a service message during a service session;
converting the service message into a common format so that the service message data is common for all types of service message;
utilizing a state machine mechanism instantiated for the service session and executing within a service control layer to intercept the service message;
selecting a rule group from a plurality of rule groups depending on a state of the service session, wherein the state of the service session is determined using the state machine mechanism executing within the service control layer;
evaluating the service message based upon the rule group;
selecting a control service from plurality of control services;
instructing the selected control service according to one or more of the rules from the selected rules group applied to the service message; and
the state machine mechanism selectively executing the control service based upon a result of the evaluating step.

2. A method according to claim 1 further comprising forwarding the message to the destination or retaining the message for processing depending on if the message is listed on an optimization list, wherein the optimization list is amended according to one or more rules from the selected rules group, and wherein the optimization list is amended after each message is processed.

3. A method according to claim 1, further comprising:
determining that the received service message is an initial request message for the service session;
determining a termination of the service session; and
upon determining the termination, discarding the state machine instance.

4. The method according to claim 1 wherein the control service is selected from the plurality of control services based on information in the service message and optionally the control service is selected based on a consumer preference referenced by consumer information in the service message.

5. A method according to claim 1 further comprising building a control instruction according to the one or more rules from the selected rules group applied to the service message and optionally further comprising adding one or more control instructions to a control sequence list for instructing one or more control services.

6. A service control system for managing a message in a service oriented architecture system, said service control system comprising:
an interface for intercepting service messages utilizing a state machine mechanism executing within a service control layer;
a service selector for selecting a rule group from a plurality of rule groups depending on a state of a service session for each intercepted service message, wherein the state of the service session is determined using the state machine mechanism executing within the service control layer, and for evaluating each of the intercepted service messages based on the selected rule group, and for converting the service messages into a common format so that the service message data is common for all types of service message;
a controller for selecting a control service from a plurality of control services and instructing the selected control service according to one or more of the rules from the selected rules group applied to the service message; and
wherein the state machine mechanism selectively executes control services based upon results of the evaluating.

7. A service control system according to claim 6 further comprising means for forwarding the message to the destination or retaining the message for processing depending on if the message is listed on an optimization list, wherein the optimization list is amended according to one or more rules from the selected rules group, and wherein the optimization list is amended after each message is processed.

8. The service control system according to claim 6, wherein said service control layer situationally takes control of a user service session when processing an initial request in accordance with said rule groups.

9. The service control system according to claim 6, wherein the service control layer comprising said interface, said service selector and said controller is configured to function as a session bridging point between a service consumer utilizing a service and a service provider of the service, wherein the service control layer is configured to permit control services to be injected into an unmodified version of the service in accordance with the rule groups.

10. The service control system according to claim 6 wherein the control service is selected from the plurality of control services based on information in the service message and optionally the control service is selected based on a consumer preference referenced by consumer information in the service message.

11. A service control system according to claim 6 further comprising means for building a control instruction according to the one or more rules from the selected rules group applied to the service message and optionally further comprising adding one or more control instructions to a control sequence list for instructing one or more control enablers.

12. A computer program product comprising a non-transitory computer readable recording medium having computer readable code stored thereon for managing a service message in a service oriented architecture system comprising a service provider, a service consumer and a plurality of control services, said computer readable code which when loaded onto a computer system and executed by at least one processor performs the following steps:
receiving a service message during a service session;
converting the service message into a common format so that the service message data is common for all types of service message;
utilizing a state machine mechanism instantiated for the service session and executing within a service control layer to intercept the service message;
selecting a rule group from a plurality of rule groups depending on a state of the service session, wherein the state of the service session is determined using the state machine mechanism executing within the service control layer;
evaluating the service message based upon the rule group;
selecting a control service from plurality of control services;
instructing the selected control service according to one or more of the rules from the selected rules group applied to the service message; and
the state machine mechanism selectively executing the control service based upon a result of the evaluating step.

13. A computer program product according to claim 12 further comprising forwarding the message to the destination or retaining the message for processing depending on if the message is listed on an optimization list, wherein the optimization list is amended according to one or more rules from the selected rules group, and wherein the optimization list is amended after each message is processed.

14. A computer program product according to claim 12, said following steps further comprising:
determining that the received service message is an initial request message for the service session;
determining a termination of the service session; and
upon determining the termination, discarding the state machine instance.

15. The computer program product according to claim 12 wherein the control service is selected from the plurality of control services based on information in the service message and optionally the control service is selected based on a consumer preference referenced by consumer information in the service message.

16. A computer program product according to claim 12 further comprising building a control instruction according to the one or more rules from the selected rules group applied to the service message and optionally further comprising adding one or more control instructions to a control sequence list for instructing one or more control enablers.

* * * * *